United States Patent [19]

Watanabe et al.

[11] Patent Number: 4,893,971
[45] Date of Patent: Jan. 16, 1990

[54] NC MACHINING APPARATUS

[75] Inventors: Takahiro Watanabe; Isao Matsumoto; Masakazu Suga, all of Hiroshima; Toshimitsu Iwai, Kure, all of Japan

[73] Assignee: Mazda Motor Corporation, Hiroshima, Japan

[21] Appl. No.: 293,006

[22] Filed: Jan. 3, 1989

[30] Foreign Application Priority Data

Jan. 20, 1988 [JP] Japan .................. 63-10092

[51] Int. Cl.⁴ ................ B23C 1/14; G05B 13/00
[52] U.S. Cl. .................. 409/80; 364/474.01
[58] Field of Search ............ 409/80, 79, 142; 318/467, 572; 364/474.01, 474.11, 474.05, 474.18; 29/26 A, 40, 27 R, 50; 82/2 B

[56] References Cited

U.S. PATENT DOCUMENTS 4,639,653 1/1987 Anderson et al. ............ 364/474.11
4,703,415 10/1987 Kishi et al. ................. 364/474.01

FOREIGN PATENT DOCUMENTS 155310  8/1985 Japan ........................ 409/80
62-88507 4/1987 Japan .
 859048  8/1981 U.S.S.R. .................... 409/142
1021525  6/1983 U.S.S.R. .................... 409/80

Primary Examiner—William Briggs
Attorney, Agent, or Firm—Wenderoth, Lind & Ponack

[57] ABSTRACT

A machining apparatus for making the scroll parts comprising a headstock including a spindle for supporting a workpiece for rotation, a tool holder for supporting a machining tool, a first carriage supported for movement in a direction perpendicular to the spindle (an X-axis), a second carriage supported for movement in a direction parallel to the spindle, and a control device for controlling the movement of the first carriage and the rotation of the spindle according. The control device is so programmed as to calculate the distance between the center of the base circle generating a desired involute curve depicted by the scroll parts and the center of the machining tool and also to calculate the angle of rotation C of the spindle relative to the distance.

3 Claims, 6 Drawing Sheets

NC MACHINING APPARATUS

BACKGROUND OF THE INVENTION

1. Field of the Invention

The present invention generally relates to a machining apparatus for making scroll parts, that is, an article of manufacture having an involute surface or wall such as generally used in a scroll compressor and, more particularly, to a numerically controlled machine tool.

2. Description of the Prior Art

Some recent models of air-conditioner employ a positive displacement scroll pump as a compressor. The positive displacement scroll pump is known as a fluid pump having an impeller or rotor that undergoes an orbital or rotary motion to transport a fluid medium from the inlet to the outlet. The positive displacement scroll pump of the type referred to above is provided with a pair of discs each having a scroll wall of a predetermined height, the discs of the pair being combined together in 180° phase shifted relationship with each other about the axis of rotation with the respective scroll walls contacting with each other. In operation, the discs are driven relative to each other to allow the fluid medium to be guided along the spiral path from the inlet towards the outlet.

The positive displacement scroll pump has numerous merits; smooth in operation, low-noise and low-vibration characteristics and high speed operating characteristics.

The shape of the scroll wall used in the positive displacement scroll pump is represented by an involute curve to meet the geometrical completeness.

The machining of the scroll wall is generally accomplished by converting the mathematic equations descriptive of an intended or desired involute curve into a programmed series of X-Y coordinate values and inputting the programmed series of X-Y coordinate values to a numerically controlled profiling machine or NC machine to cause the tool and the workpiece to undergo a relative movement. The conventional NC machining system however has some problems in that the machining time is limited because of the information processing capability of the NC machining system and in that, in the event that interpolation is carried out in the X-Y coordinate system, an error in movement of the machining tool at a central portion of the workpiece tends to be increased due to a time-lag of the servo follow-up of the drive motor and, therefore, a high speed feed cannot be attained.

In view of the problems inherent in the conventional NC machining system, for example, the Japanese Laid-open Patent Publication No. 62-88507 published Apr. 23, 1987, discloses a NC machining system wherein the center of the machining tool is moved on the straight line tangential to the base circle generating the involute curve while, in synchronism with the movement of the machining tool, the workpiece is rotated about the center of such base circle. According to this prior art machining system, the direction of movement of the machining tool is normal to the involute curve and, therefore, a high speed, highly accurate machining can be accomplished.

However, the prior art NC machining system referred to above requires the machining tool to be offset on the base circle of the involute curve (or on the straight line tangential to such base circle) before the machining is carried out by moving the workpiece in a direction perpendicular thereto. In other words, the prior art NC machining system has to be so designed that the machining tool be supported not only for movement in two direction in a common plane while the workpiece can be rotatably supported, but also for movement in a direction parallel to the machining direction and perpendicular to the common plane in which the machining tool can move in the two directions, that is, in a direction parallel to the axis of rotation of the workpiece.

Therefore, in the prior art NC machining system, the machine requires an increased number of operating axes rendering it to be bulky and costly to make.

SUMMARY OF THE INVENTION

Accordingly, the present invention has been devised with a view to substantially eliminating the above discussed problems inherent in the prior art machining systems and has for its essential object to provide an improved NC machining apparatus can be manufactured compact and at low cost while having a capability of accomplishing a high speed and highly accurate machining of the scroll parts.

According to a preferred embodiment of the present invention herein disclosed, the machining apparatus for making the scroll parts comprises a headstock means including a spindle for supporting a workpiece for rotation, a tool holding means for supporting a machining tool, a first carriage means supported for movement of the tool holding means in a direction perpendicular to the spindle (an X-axis), a second carriage means supported for movement in a direction parallel to the spindle, and a control device for controlling the movement of the tool holding means of the first carriage means and the rotation of the spindle.

The control device is so programmed as to calculate the distance x between the center of the base circle generating a desired involute curve depicted by the scroll parts and the center of the machining tool according to the following equation I) and also to calculate the angle of rotation C of the spindle relative to the distance x according to the following equation (II):

$$x = \sqrt{a^2 + [a(\theta + \psi) + D/2]^2} \quad \text{(I)}$$

and $$C = \theta - \tan^{-1}\{[a(\theta + \psi) + D/2]/a\} \quad \text{(II)}$$

wherein a represents the radius of the base circle generating the involute curve, $\theta$ represents the involute angle, $\psi$ represents the angle as measured between the X-axis and the starting point of the involute curve, and D represents the diameter of the machining tool.

The present invention is therefore effective to accomplish the profiling of the scroll parts relying only on the rotation of the workpiece and the movement of the machining tool in the X-axis direction at a high speed and highly accurately.

BRIEF DESCRIPTION OF THE DRAWINGS

This and other objects and features of the present invention will become clear from the following detailed description of a preferred embodiment thereof taken with reference to the accompanying drawings, in which.

DETAILED DESCRIPTION OF THE EMBODIMENT

Figure 1:
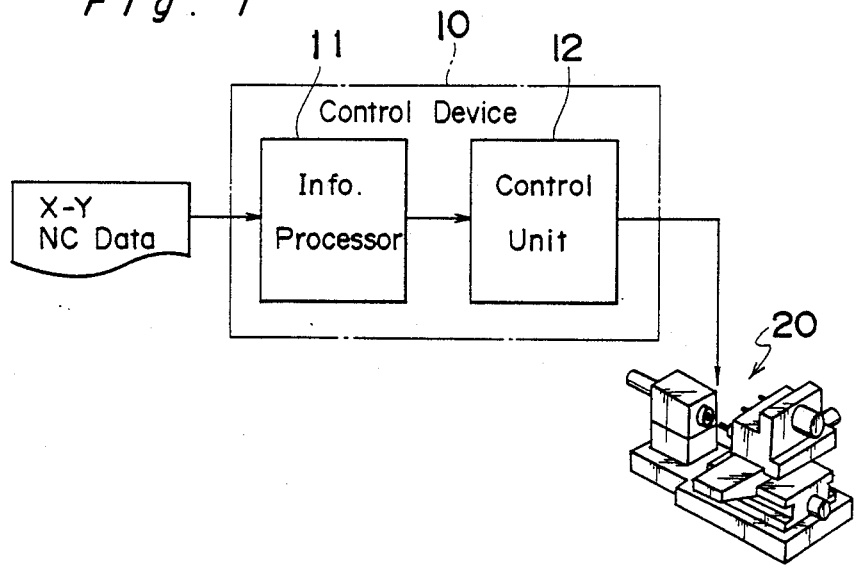
FIG. 1 is a schematic diagram showing a NC machining apparatus for making scroll parts according to one preferred embodiment of the present invention.

Referring first to FIG. 1 showing the system layout, a NC machining apparatus according to the present invention comprises a machine tool 20 having a control device generally identified by 10. The control device 10 comprises a microcomputer programmed to control the sequence of the machining operation performed by the machine tool 20 to provide an end product which is a scroll part having a curved wall or surface depicting an involute curve.

Figure 2:
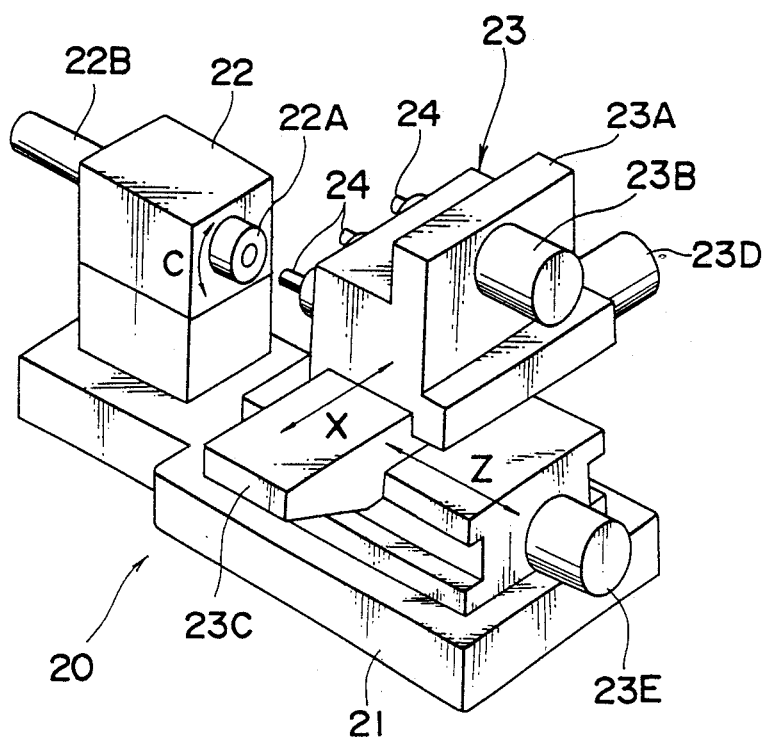
FIG. 2 is a schematic perspective view of a machine tool used in the NC machining apparatus.

As best shown in FIG. 2, the machine tool 20 comprises a horizontal machine bed 21 having a headstock 22 and a carriage 23. The headstock 22 is rigidly mounted on the machine bed 21 and carries a spindle 22A adapted to be driven by a servo motor 22B, said spindle being used to support a workpiece for rotation together therewith in a direction shown by the arrow C. The carriage 23 includes a saddle 23C mounted on the machine bed through a support runaway for movement in a direction close towards and away from the headstock 22 in a Z-axis direction shown by the arrow Z, and a tool holder block 23A for the support of a plurality of machining tools 24 adapted to be driven by a drive motor 23B, said tool holder block 23A being mounted on the saddle 23C for movement in an X-axis direction, shown by the arrow X, perpendicular to the Z-axis direction. The tool holder block 23A and the saddle 23C are adapted to be driven by respective servo motors 23D and 23E. Each of the motors 22B, 23B, 23D and 23E are adapted to be controlled by the control device 10 in a programmed sequence so that the rotation of the spindle 22A, hence, the workpiece, the selection and drive of the machining tools 24, the movement of the tool holder block 23A, hence, the machining tool 24, in the X-axis direction, and the movement of the saddle 23C, hence, the machining tools 24, in the Z-axis direction can coordinated with each other to accomplish an intended machining of the scroll parts.

When the actual machining is desired to be performed, X-Y coordinate values programmed in an NC processor language to represent points on the X-Y coordinate system required to depict a desired involute curve are inputted to the control device 10 to permit the workpiece on the spindle 22A to be rotated and also to permit the tool holder block 23A, with a selected one of the machining tools 24 concentrically aligned with the spindle 22A, to be driven in the X-axis direction.

Figure 3:
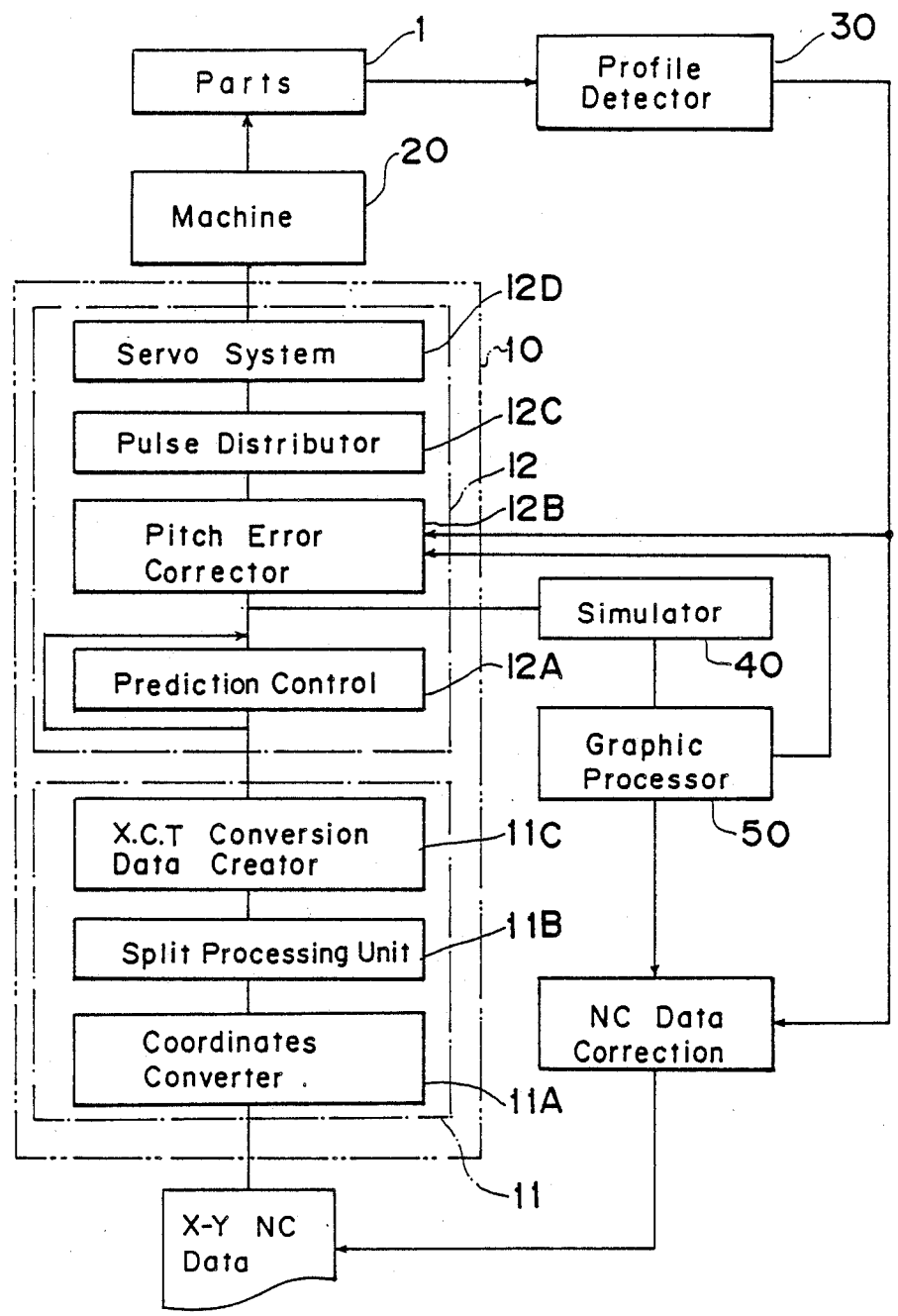
FIG. 3 is a diagram showing a system layout of the NC machining apparatus embodying the present invention.

As shown in FIG. 1, the control device 10 comprises an information processor (data creating unit) 11 and a control unit (NC unit) 12 for controlling the machine tool 10 according to a series of coded information processed and furnished by the information processor 11, the details of each of the units 11 and 12 being shown in FIG. 3 in block circuit representation.

Referring to FIG. 3, the information processor 11 includes a coordinate converter 11A operable to calculate and convert X-Y coordinate data, descriptive of the desired involute curve expressed by the NC processor language, into polar coordinate data according to a programmed equation, a split processing unit 11B operable to divide the data to accomplish an interpolation for optimizing the trace of movement, and an X.C.T conversion data creator 11C operable to calculate both of the position on the X-axis (the amount of movement in the X-axis direction) and the angle of rotation of the spindle 22A and a distributed times T during which the tool holder block 23A is moved in the X-axis direction or the spindle 22A is driven. Results of calculation performed in the information processor 11 are outputted to the control unit 12 as will be described later.

Figure 4:
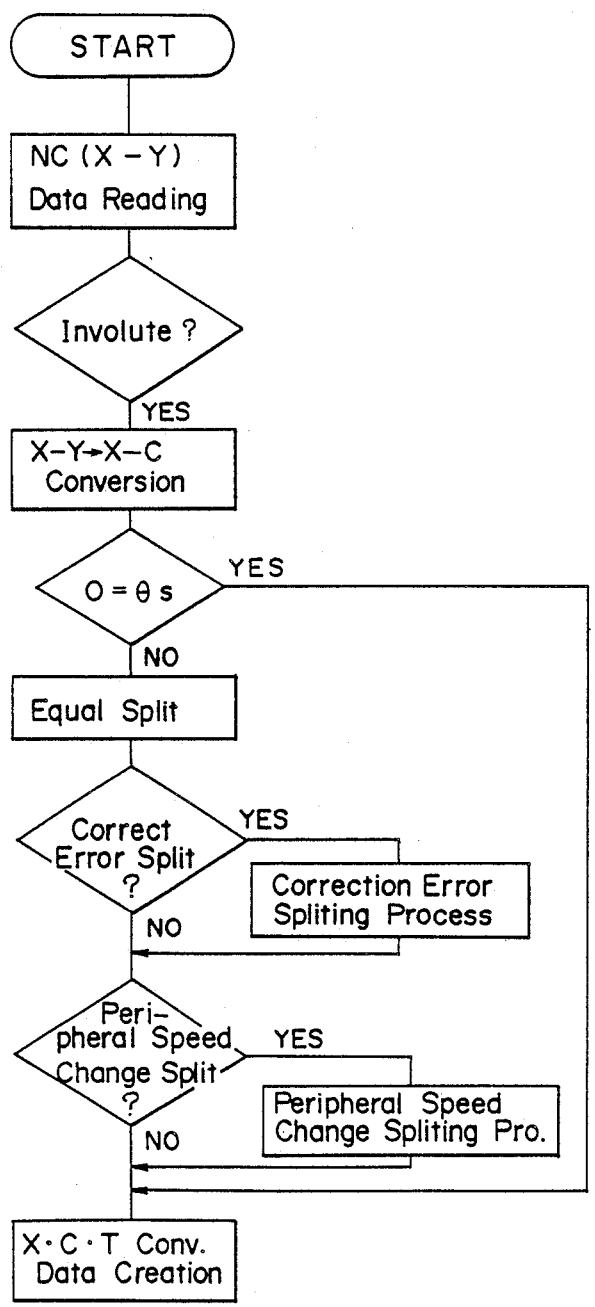
FIG. 4 is a flowchart showing the sequence of operation of an information processor used in the NC machining apparatus.

The sequence of operation of the information processor 11 described above is illustrated in the flowchart of FIG. 4. As shown therein, when the data expressed by the NC processor language (the X-Y coordinate data) are inputted, the data are read in and a decision is them made to determine if the data so read in represent the desired involute curve. If a result of the decision indicates that the data read in represent the involute curve, the X-Y coordinate data are converted into the polar coordinate values (X-C). These decision and conversion are performed by the coordinate converter 11A. Subsequently, if the involute angle θ does not attain an involute terminating angle θs, the slit processing unit 11B performs an equal splitting process for dividing the converted data and, if necessary, also a correction error splitting process and a peripheral velocity change dividing process both as will be described later. Thereafter, the conversion data creator 11C provides X.C.T converted data.

The conversion of the X-Y coordinate data into the polar coordinate data, which is performed by the coordinate converter 11A, is carried out according to the following equations (I) and (II).

Figure 5:
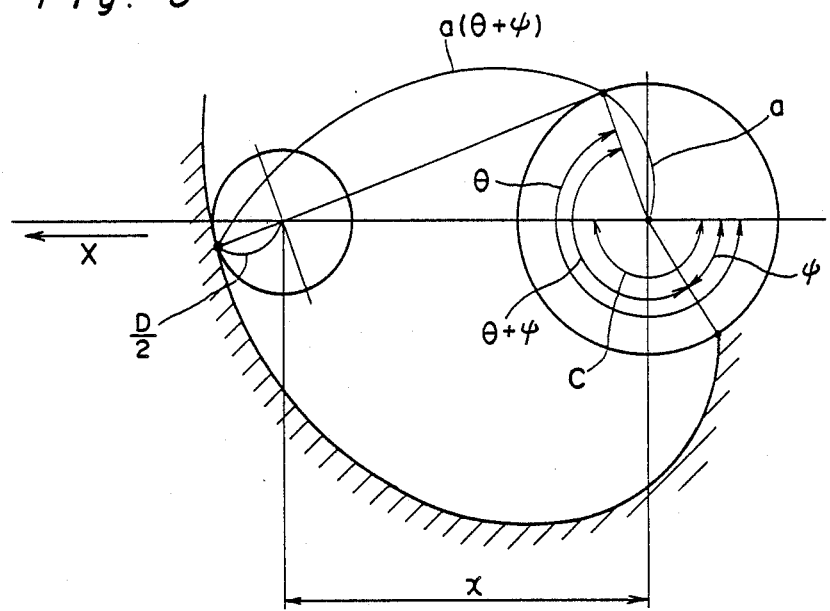
FIG. 5 is a diagram used to explain the coordinate conversion system.

Referring to FIG. 5, let it be assumed that a represents the radius of the base circle generating the involute curve, θ represents the involute angle, Ψ represents the angle as measured between the X-axis and the starting point of the involute curve, and D represents the outer diameter of a milling cutter forming the machining tool used in the machine tool. Then, the position on the X-axis direction (the distance x between the center of the base circle of the involute curve and the center of the machining tool is calculated according to the following equation (I):

$$x = \sqrt{a^2 + [a(\theta + \psi) + D/2]^2} \tag{I}$$

It is to be noted that the angle Ψ from the X-axis to the starting point of the involute curve may take a positive (+) value if the involute curve extends in a positive direction, but a negative (−) value if the involute curve extends in a negative direction. It is also to be noted that the value of D/2 (the maximum radius of the milling cutter) may take a negative (-) value if the scroll surface represents an inner wall surface such as shown in FIG.

5, but a positive (+) value if the scroll surface represents an outer wall surface.

The angle of rotation C of the spindle 22A from the X-axis in correspondence with the calculated distance x is determined according to the following equation (II):

$$C = \theta - \tan^{-1}\{[a(\theta + \psi) + D/2]\}/a \qquad (II)$$

Hereinafter, the data splitting method for the determination of an interpolation interval between the data will be discussed.

As hereinbefore described, the data can be split according to one of the three different methods, that is, the equal splitting process, the correction error splitting process and the peripheral speed change splitting method, each of which will now be described.

Figure 6A:
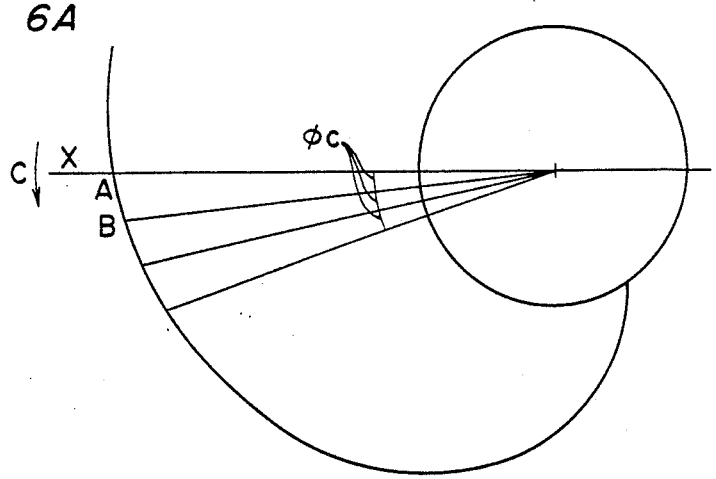
Figure 6B:
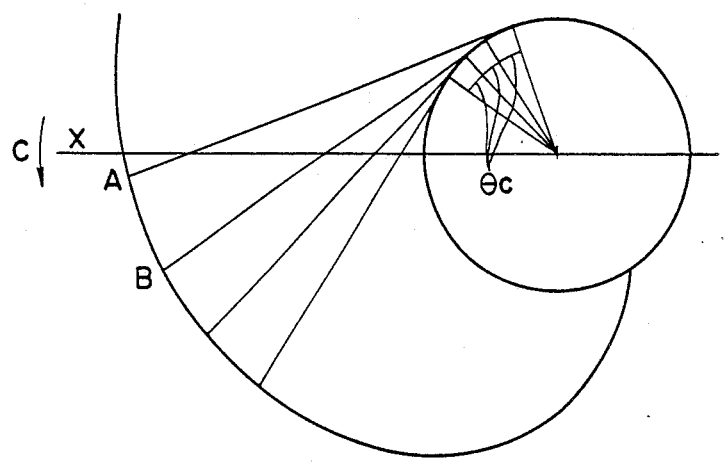

The equal splitting method is the one in which, as shown in FIGS. 6A and 6B, the data are divided for each predetermined angle of rotation C or involute angle. FIG. 6A illustrates an example in which a machining interval A to B divided with the angle of rotation C fixed is rendered to be one block, whereas FIG. 6B illustrates an example in which a machining interval A to B divided with the involute angle fixed at $\theta c$ is rendered to be one block.

Figure 7:
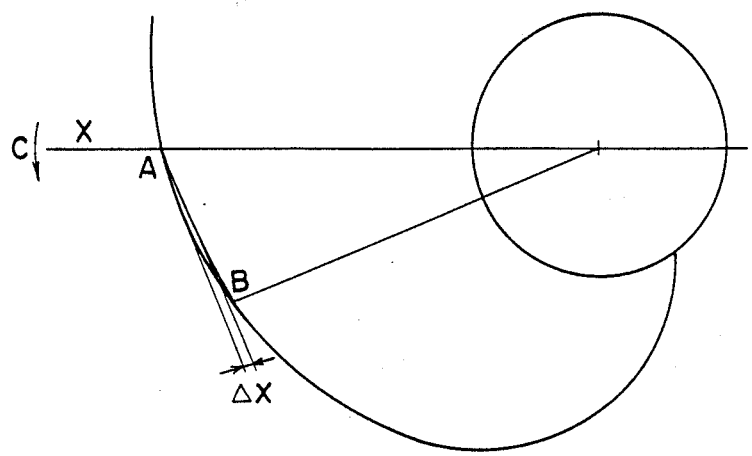

The correction error splitting method is a linear interpolation in one divided block and the one in which the width of one block (Splitting width: A to B) is so determined that an error $\Delta x$ which will occur between a theoretical value (a theoretical trace of movement as shown by the solid line in FIG. 7) and an actual value (an interpolated trace of movement as shown by the broken line in FIG. 7) can be smaller than a predetermined value.

Figure 8:
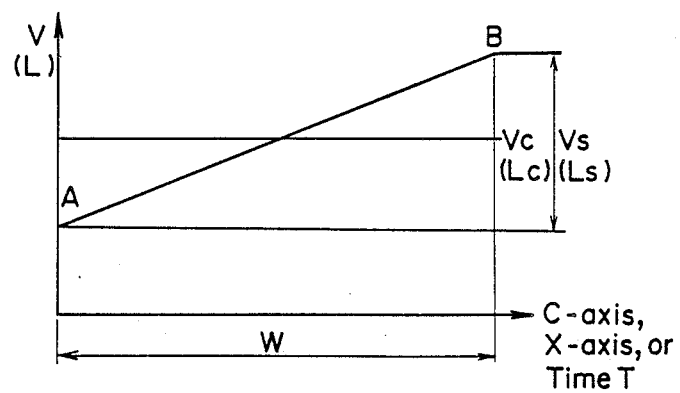
FIGS. 6 to 8 are diagrams used to explain a data splitting process.

The peripheral velocity change splitting method is the one in which, in view of the fact that, where the machining is carried out so as to depict an involute curve on a two-axis basis (movement in the X-axis direction and the rotation in the direction C) such as accomplished with the machine of the present invention, the machining distance in one block is not proportional to either the distance x and the angle of rotation C, even though the average peripheral velocity (machining speed) is a specified peripheral velocity the actual machining speed V is different between that at the starting point within the block and that at the terminating point within the same block as shown in FIG. 8. Therefore, in the peripheral velocity change splitting method, a predetermined range of peripheral velocity Vs including the specified peripheral velocity Vc is provided so that the width W of one block within which the change in peripheral velocity falls can be determined. Alternatively, the width W of one block may be determined while the machining distance L for a given time is used as a predetermined range Ls including a specified machining distance. In practice, it suffices for the process to be carried out so that the ratio of the tolerance Vs for the peripheral velocity relative to the specified peripheral velocity V, that is, V/Vs, can be smaller than a predetermined value.

As shown in FIG. 3, the control device 12 is operable to control and drive the machine tool 20 according to the X.C.T. data supplied from the information processor 11. This control device 12 comprises a prediction control 12A, a pitch error corrector 12B, a pulse distributor 12C and a servo system 12D. After the X.C.T data supplied from the information processor 11 have been corrected by the prediction control 12A and the pitch error corrector 12B, pulses are distributed by the pulse distributor 12C for causing the servo system 12D to subsequently drive the servo motors 23C and 22B of the machine tool 20. Although not shown, speed sensors operatively coupled with the respective servo motors 23C and 22B and position detectors operatively coupled with the tool holder block 23A and the spindle 22A provide respective output signals to the control device 12 on a feedback scheme so that the respective speeds of drives of the servo motors 23C and 23C and 22B and the respective positions of the tool holder block 23A and the spindle 22A can be monitored at all timed during the operation.

The prediction control 12A is operable to determine a transfer function in reference to frequency characteristics of the servo system 12D that have been determined as a result of a series of experiments and to correct the X.C.T data according to the transfer function so determined. More specifically, by multiplying each of the speed of movement of the machining tool and/or the workpiece and the acceleration thereof by a predetermined coefficient, a correction value can be calculated which is subsequently added to the X.C.T data so that the corrected X.C.T data can be used to compensate for an error in follow-up of the servo system 12D, thereby to improve the machining accuracy. It is to be noted that no prediction control may be effected if not desired.

The pitch error correction performed by the pitch error corrector 12B is a process to calculate a correction value utilizable to correct the angle of rotation C by detecting a difference between the profile (involute curve) of the machined workpiece, that is, the scroll parts, measured by a profile detector 30, and an ideal curve, to store the correction value in a memory for a given angle of rotation C, and then to correct the machining profile of a workpiece to be subsequently machined by adding the correction value to the X.C.T data. It is to be noted that input data can be corrected or modified in reference to the result of measurement performed by the profile detector 30.

Figure 9:
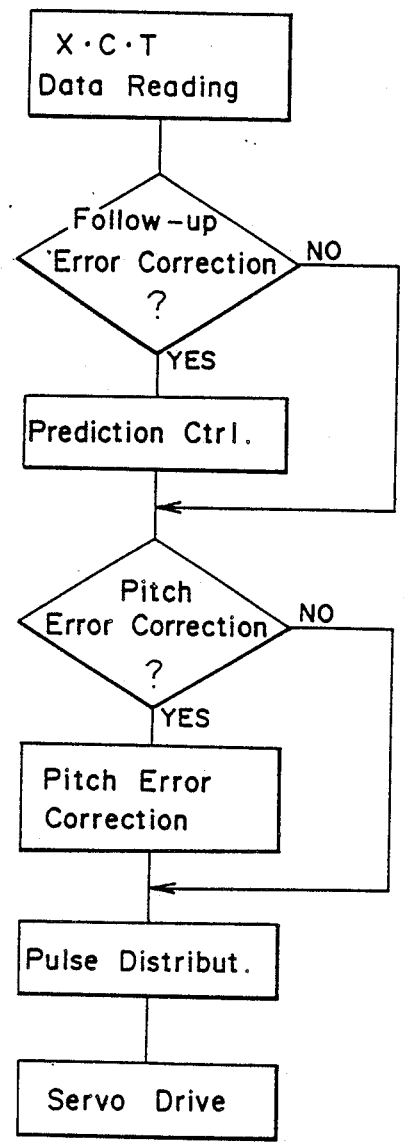
FIG. 9 is a flowchart showing the sequence of operation of a control device.

The sequence of operation of the control device 12 is shown in the flowchart of FIG. 9. Referring now to FIG. 9, the X.C.T data supplied from the information processor 11 are first read in and, if the prediction control is required, the prediction control is subsequently carried out. After the pitch error correction to be subsequently carried out if the pitch error correction is required, the pulses are distributed by the pulse distributor 12C, followed by the control and drive of the servo system 12D.

In the illustrated system, as shown in FIG. 3, simulation is possible which is performed by a simulator 40 in dependence on the X.C.T data which have been corrected by the prediction control 12A as to the follow-up error so that the simulated curve can be compared with the ideal curve delineated by a graphic processor 50. Error data obtained by this comparison can be used for the correction of the input data or the correction of the pitch error.

As hereinbefore described, according to the machining apparatus of the present invention, the number of operating axes which are to be operated simultaneously is two and, therefore, the machining apparatus can be manufactured compact and at low cost while having a capability of accomplishing a high speed and highly accurate machining.

Although the present invention has been fully described in connection with the preferred embodiment thereof with reference to the accompanying drawings, it is to be noted that various changes and modifications are apparent to those skilled in the art. By way of example, although the machine tool has been shown as a horizontal mode, the present invention can be equally applicable to an up-right model.

Accordingly, such changes and modifications are to be understood as included within the scope of the present invention as defined by the appended claims unless they depart therefrom.

What is claimed is:

1. A machining apparatus for making the scroll parts which comprises a headstock means including a spindle for supporting a workpiece for rotation;
    a tool holding means for supporting a machining tool;
    a first carriage means supported for movement of the tool holding means in a direction perpendicular to the spindle (an X-axis);
    a second carriage means supported for movement of the tool holding means in a direction parallel to the spindle; and
    a control device for controlling the movement of the first carriage means and the rotation of the spindle;
    said control device being programmed so as to calculate the distance x between the center of the base circle generating a desired involute curve depicted by the scroll parts and the center of the machining tool according to the following equation (I) and also to calculate the angle of rotation C of the spindle relative to the distance x according to the following equation (II):

$$x = \sqrt{a^2 + [a(\theta + \psi) + D/2]^2} \quad (I)$$

and $$C = \theta - \tan^{-1}\{[a(\theta + \psi) + D/2]/a\} \quad (II)$$

wherein a represents the radius of the base circle generating the involute curve, $\theta$ represents the involute angle, $\Psi$ represents the angle as measured between the X-axis and the starting point of the involute curve, and D represents the diameter of the machining tool.

2. The apparatus as claimed in claim 1, wherein said control device includes an information processor, said information processor including a coordinate conversion unit, a split processing unit and an X.C.T data creator.

3. The apparatus as claimed in claim 1, wherein said control device includes an NC control unit, said NC control unit including a prediction control, a pitch error corrector, a pulse distributor and a servo system.

* * * * *